tion in the preferred embodiment of this invention. When aliphatic carbon-to-carbon unsaturation is herein referred to, olefinic unsaturation is meant.

United States Patent Office
3,488,305
Patented Jan. 6, 1970

3,488,305
POLYESTER RESINS WHICH ARE SEMI-RIGID, FIRE RETARDANT, AND RESISTANT TO CORROSION AND CRACK-CRAZING
Carmine A. Siconolfi, Tonawanda, and Brian L. Swanson, Williamsville, N.Y., assignors to Hooker Chemical Corporation, Niagara Falls, N.Y., a corporation of New York
No Drawing. Filed Dec. 28, 1967, Ser. No. 694,111
Int. Cl. C08f 21/02; C08g 17/10
U.S. Cl. 260—22                          11 Claims

ABSTRACT OF THE DISCLOSURE

New polyester resins which are semi-rigid, fire retardant, resistant to corrosion and crack-crazing are produced from a mixture of (A) a polymerizable compound containing aliphatic carbon-to-carbon unsaturation, and (B) a polymerizable polyester of ingredients comprising (1) an adduct of hexahalocyclopentadiene and a polycarboxylic compound containing aliphatic carbon-to-carbon unsaturation, (2) a polycarboxylic compound containing aliphatic carbon-to-carbon unsaturation, (3) dimer acid, and (4) 2,2,4-trimethyl-1,3-pentanediol. The rigidity of the cured resin is adjustable.

The new resins find application in castings for live electrical contacts, pipes, wall coverings, panels and the like.

BACKGROUND OF THE INVENTION

Historically, the highly chemically resistant field has been dominated by epoxy resins, particularly in the area of resin rich, centrifugal pipe fabrications. Although the epoxy resins have the desired chemical resistance, heat distortion temperature, and cure properties, their use is limited by their high price. Chemically resistant polyester resins have been made but although they exhibit the desired chemical resistance and price, their heat distortion temperatures were too high to permit centrifugal fabrication, which requires a heat distortion temperature of about 65 to about 80 degrees centigrade. While it was possible to decrease the rigidity (heat distortion temperature) of the polyester resin, there was a corresponding decrease in the degree of chemical resistance.

A disadvantage of the polyester resins was their tendency to undergo crack-crazing upon cure. The rupturing of unsaturated double bonds in the unsaturated monomer solvent and unsaturated esterification product solute during the final copolymerization cure results in the production of heat. The majority of heat liberated during cure are released over a relatively short period of time, and the more highly unsaturated the polyester resin is, the larger the heat of reaction or heat of cure. The curing polyester mass undergoes severe thermal expansion as a result of the heat of cure because of the relatively small coefficient of thermal conductivity of polyesters and their relatively large coefficient of thermal expansion. Coincident with the thermal expansion, the curing polyester mass undergoes shrinkage or contraction as a result of the uncured liquid polyester resin being converted to a cured solid mass—the unsaturated monomer solvent and the unsaturated esterification product solute are chemically bonded through their unsaturated sites. The greater the number of unsaturated sites, the greater the shrinkage or contraction. As a result of the simultaneous expansion and contraction of the curing polyester, physical stresses are generated in the polyester mass which often causes fracturing or crack-crazing. Crack-crazes in the cured polyester mass results in poor physical strength and poor resistance to corrosive attack. The greater the degree of unsaturation in the polyester resin, the more likely the cured resin will be chemically resistant. However, it is also more likely that the resin will be rigid and will crack-craze upon curing.

It is an object of this invention to provide a polyester resin which is semi-rigid. It is also the object of this invention to provide a resin which undergoes less shrinkage during cure. Another object is to provide a resin which has an adaptable curing rate. A further object of this invention is to provide a resin in which the heat of cure will be dissipated evenly, uniformly, and over a long period of time. A still further object is to provide a polyester resin with a heat distortion temperature low enough to permit resin rich, centrifugal fabrications. It is also the object of this invention to accomplish all of these objectives while providing an economical polyester resin which has a high degree of chemical resistance.

SUMMARY

This invention relates to new polyester resins which are semi-rigid, fire retardant, and resistant to corrosion and crack-crazing. More particularly, this invention relates to new polester resins which are semi-rigid, fire retardant, resistant to corrosion and crack-crazing, and are produced from a mixture of (A) a polymerizable compound containing aliphatic carbon-to-carbon unsaturation, and (B) a polymerizable polyester of ingredients comprising (1) an adduct of hexahalocyclopentadiene and a polycarboxylic compound containing aliphatic carbon-to-carbon unsaturation, (2) a polycarboxylic compound containing aliphatic carbon-to-carbon unsaturation, (3) dimer acid, and (4) 2,2,4-trimethyl-1,3-pentanediol. The resin can be made trixotropic by adding a thickening agent and the rigidity of the cured resin is adjustable.

DESCRIPTION OF THE PREFERRED EMBODIMENT

In the first step of the preferred process of this invention, a polymerizable polyester of ingredients comprising (1) an adduct of a polyhalogenated cyclopentadiene and a polycarboxylic compound containing aliphatic carbon-to-carbon unsaturation, (2) a polycarboxylic compound containing aliphatic carbon-to-carbon unsaturation, (3) dimer acid, and (4) 2,2,4-trimethyl-1,3-pentanediol is produced.

The preferred polyhalogenated cyclopentadiene compound has the formula:

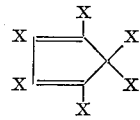

wherein each individual X is selected from the group consisting of fluorine, chlorine, bromine and alkoxy radical of 1 to 10 carbon atoms, said cyclopentadiene containing at least 4 and preferably 6 halogen substituents.

The polyhalogenated cyclopentadienes suitable for use in this invention include: hexachlorocyclopentadiene; 5,5-dimethoxytetrachlorocyclopentadiene; hexabromocyclopentadiene; 2,5-dibromotetrachlorocyclopentadiene; 5,5-difluorotetrachlorocyclopentadiene; 5,5 - diethoxytetrachlorocyclopentadiene, and the like. Of these hexachlorocyclopentadiene is preferred.

The polycarboxylic compounds containing aliphatic carbon-to-carbon unsaturation include unsaturated polycarboxylic acids or acid anhydrides or acid halides. Examples are the respective compounds of maleic; fumaric; substituted maleic and fumaric such as citraconic, chloromaleic, mesaconic and pyrocinchonic; acetylene dicarboxylics; substituted succinics such as aconitic and itaconic; and the like. The polycarboxylic compound is employed in the polymerizable polyester as a separate ingredient and also as a dienophile in the Diels-Alder adduction. The separate ingredient and the dienophile can be the same polycarboxylic compound or can be different polycarboxylic compounds. The preferred polycarboxylic compound containing aliphatic carbon-to-carbon unsaturation present as a separate ingredient in the polymerizable polyester is fumaric acid, and the preferred polycarboxylic compound employed as a dienophile is maleic acid.

Typical Diels-Alder adducts include 1,4,5,6,7,7-hexachlorobicyclo-(2.2.1)-5-heptene-2,3-dicarboxylic acid and anhydride;
1,4,5,6,7,7-hexabromobicyclo-(2.2.1)-5-heptene-2,3-dicarboxylic acid;
1,4,5,6,7,7-hexachloro-2-methylbicyclo-(2.2.1)-5-heptene-2,3-dicarboxylic anhydride;
1,4,5,6,7-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride;
5,6,7,8,9,9-hexachloro-1,2,3,4,4a,5,8,8a-octahydro-5,8-methano-23-naphthalene dicarboxylic acid and anhydride;
1,2,3,4,5,6,7,7-octachloro-3,6-methano-1,2,3,6-tetrahydrophthalic acid and anhydride;
2,3-dicarboxy-5,8-endomethylene-5,6,7,8,9,9-hexacloro-1,2,3,4,4a,5,8,8a-octahydronaphthalene anhydride;
2,3-bis(ethylene carboxy)-1,4,5,6,7,7-hexachlorobicyclo (2.2.1)-5-heptene; and
1,4,5,6,7,7-hexachlorobicyclo-(2.2.1)-5-heptene-2,3-dicarbonyl chloride.

The Diels-Alder adduct generally comprises from about 0.05 to about 0.35 mole fraction of the polymerizable polyester, preferably from about 0.075 to about 0.30 mole fraction. The polycarboxylic compound present as a separate ingredient generally comprises from about 0.10 to about 0.40 mole fraction of the polymerizable polyester, preferably from about 0.20 to about 0.37 mole fraction.

Processes for forming dimer acid are well known and form the subject of numerous United States patents, including Nos. 2,482,761; 2,793,220; 2,793,221; and 2,955,121. In carrying out said dimer-forming operation, unsaturated fatty acids such as oleic, linoleic and linolenic acid, or mixtures of such acids (usually admixed with saturated fatty acid), all of essentially $C_{18}$ chain length, are heated in the presence of water, or in the presence of both water and an active clay mineral, to induce polymerization. The polymeric fatty acid reaction mixtures so prepared contain from about 30 to 75 percent by weight of acid polymer, with the balance of the mixture representing $C_{18}$ monocarboxylic (monomer) acids of one type or another which are distilled from the mixture once the polymerization operation is concluded. The residual polymer fraction consists essentially of dimer ($C_{36}$ dicarboxylic acids) together with amounts up to about 20–22 percent of $C_{54}$ trimer. However, the trade customarily refers to this dimer-trimer mixture as "dimer," and this practice is followed herein. The dimer acid generally comprises from about 0.01 to about 0.20 mole fraction of the polymerizable polyester, and preferably from about 0.035 to about 0.17 mole fraction. The degree and rigidity of the cured polyester resin can be varied by changing the amount of dimer acid employed. A small amount of auxiliary saturated acids or acid anhydrides such as adipic, phthalic, isophthalic, terephthalic, tetrachlorophthalic, tetrabromophthalic, succinic, azelaic, and the like can be employed with the dimer acid.

Crack-crazing curing of the polyester resin is controlled by employing 2,2,4-trimethyl-1,3-pentanediol in the polymerizable polyester. Without being limited to theory the pendent isopropyl group of the diacid shields the double bond used to cross-link and polymerize the resin. Thus, when using a long chain peroxide, the material can cross-link quite readily, whereas when using a bulky peroxide, the pendent group appears to slow down the cross-linking reaction and thereby slow the curing time required. The diol is generally employed from about 0.45 to about 0.60 mole fraction of the polymerizable polyester, preferably from about 0.49 to about 0.55 mole fraction. Diols such as 2,2-dimethyl-1,3-propanediol; propylene glycol; 1,2-propanediol; hydrogenated bisphenol A; oxyalkylated bisphenol A; and the like can be added as auxiliary diols with the 2,2,4-trimethyl-1,3-pentanediol.

The polymerizable compound containing aliphatic carbon-to-carbon unsaturation is selected from the conventional olefinic or ethylenically unsaturated cross-linking agents. Typical compounds include styrene, diallylphthalate, diallylisophthalate, triallylcyanurate, acrylic acid, methacrylic acid, methylmethacrylate (and other acrylic and methacrylic esters), vinyltoluene, chlorostyrene, methylstyrene and the like. The compound generally comprises from about 25 to about 50 weight percent of the uncured polyester resin.

A preferred procedure for preparing the polyester resins involves introducing the selected ingredients, in predetermined proportions, into a suitable esterification vessel provided with heating and/or cooling means, an agitator, means for maintaining an atmosphere of an inert gas such as nitrogen or carbon dioxide over the reaction mixture, means for removing water of esterification, an inlet, and outlet, and any other accessories necessary for the reaction. The charge reactants are blanketed with an inert atmosphere, then agitated and heated to about 145° C. to about 170° C. to effect the reaction for the specified period of time. After the desired degree of reaction has been attained, as conveniently determined by employing the acid number technique or measuring the amount of water liberated, the reaction mixture is cooled. If solid, the resulting product, is broken up. The resin is then mixed with the polymerizable compound containing aliphatic carbon-to-carbon unsaturation, preferably in the presence of a polymerization inhibitor.

The cross-linking agent can be advantageously combined with the polymerizable polyester while the unsaturated polyester and the olefinic cross-linking agent are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and olefinic cross-linking agents, particularly if the mixture is to be stored or shipped in commerce prior to curing, are substances such as hydroquinone, benzoquinone, para-tertiarybutyl catechol, para-phenylene diamine, trinitrobenzene, picric acid, and the like.

Polymerization catalysts are preferably added to the mixture of unsaturated polyester and olefinic cross-linking agent to effect setting or curing. Catalysts such as benzoyl peroxide, acetyl peroxide, lauroyl peroxide, methyl ethyl ketone peroxide, cumene hydroperoxide, t-butyl peroxide, and the like, have been found satisfactory. Such catalysts are used in a proportion of 0.01 to 10 percent depending on the efficiency of their action and whether or not substances which inhibit polymerization are present in the mixture to be cross-linked. The polymerization reaction may also be hastened by effecting it in the presence of promoters such as metals or metal salts, cobalt resinate, cobalt maleate, cobalt naphthenate, and the like, or, by amines such as dibutyl amines, or mercaptans such as dodecyl mercaptan, and the like. These are used in proportions similar or smaller to that stated for catalysts.

The polymerization conditions for effecting the cross-linking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crack-crazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making moldings embodying the compositions of this invention may be made by mixing into the unsaturated linear polyester and olefinic cross-linking agent mixture, an inert filler such as chopped fiber glass rovings, macerated fabric, asbestos fibers, mica, etc., which serve as fibrous reinforcing media and incorporating a small percentage of a mold lubricant, catalyst and/or promoter.

It is to be understood that dyes, pigments, plasticizers, lubricants and various other modifying agents are contemplated as being incorporated in certain formulations to produce compositions embraced in this invention in order to obtain or accentuate any given property.

The following examples are presented to illustrate the novel compounds of this invention. It is to be understood that the examples are not to be construed as limiting the invention. All temperatures are in degrees centigrade and all parts are by weight, unless otherwise indicated.

EXAMPLE 1

A polyester resin was prepared by the condensation, esterification of 0.35 mole fraction fumaric acid, 0.15 mole fraction isophthalic acid and 0.50 mole fraction 1,2-pentanediol and was dissolved in 30 percent by weight styrene. Portions of the resin were cured at 80 degrees centigrade using tert-butyl peroctoate, at 100 degrees centigrade using methyl-ethyl ketone peroxide, and at 100 degrees centigrade using benzoyl peroxide as catalysts. In all cases, the resin showed a pronounced tendency to crack-craze.

EXAMPLE 2

A polyester resin comprised of 0.2890 mole fraction maleic anhydride, 0.0508 mole fraction dimer acid, 0.1602 mole fraction chlorendic acid, and 0.50 mole fraction neopentyl glycol was dissolved in 29 percent by weight styrene and cured at 100 degrees centigrade with benzoyl peroxide. The cured resin was boiled in 10 percent sodium hydroxide. After 96 hours it was impossible to recover the resin from the sodium hydroxide solution because the resin had deteriorated. Resins prepared with a small mole fraction of dimer acid did not deteriorate but still exhibited only fair resistance to the sodium hydroxide.

EXAMPLE 3

A polyester resin of 0.50 mole fraction 2,2,4-trimethyl-1,3-pentanediol, 0.3398 mole fraction maleic anhydride, and 0.1602 mole fraction chlorendic acid was dissolved in 32 percent by weight styrene. The polyester resin was cured at 100 degrees centigrade with benzoyl peroxide and found to have a heat distortion temperature (130 degrees centigrade) which was too high to permit centrifugal fabrication.

EXAMPLE 4

A polyester resin comprised of 0.50 mole fraction 2,2,4-trimethyl-1,3-pentanediol, 0.0801 mole fraction dimer acid, 0.3398 mole fraction fumaric acid, and 0.0801 mole fraction chlorendic acid, esterified at 165° C. was dissolved in 32 percent by weight styrene and cured at 100 degrees centigrade with benzoyl peroxide. There was no tendency to crack-craze during the cure, and there was no tendency to crystallize out of the styrene solution. The cured resin had a heat distortion temperature of 65 degrees centigrade, which permits centrifugal fabrications.

EXAMPLE 5

A polyester resin was prepared as in Example 4 except that the dimer acid comprised 0.0401 mole fraction and the chlorendic acid comprised 0.1201 mole fraction. The resin did not show a tendency to crack-craze during the cure. The cured resin had a heat distortion temperature of 100 degrees centigrade.

EXAMPLES 6–8

Three portions of the resin of Example 4 was catalyzed with 1 percent of different peroxide catalysts. The catalyzed resin was adjusted to a temperature of 25 degrees centigrade, a thermocouple attached to a recorder was placed in the sample of catalyzed resin and the sample was placed in a bath at 82.2 degrees centigrade. The catalyst used in the first portion was tert-butyl peroctoate and the portion exhibited a peak exotherm of about 220 degrees centigrade. The time to the peak exotherm temperature was about 10 minutes.

The catalyst employed in the second portion of the resin was methyl-ethyl ketone peroxide. It exhibited a peak exotherm of about 180 degrees centigrade and required about 17½ minutes to attain this temperature.

The catalyst used in the third portion of the resin was benzoyl peroxide. It exhibited a peak exotherm of about 100 degrees centigrade. This temperature was reached after 11 minutes and maintained before decreasing for an additional 4½ minutes.

It can be seen that the rate of cure can be adjusted by the selection of the proper catalyst.

EXAMPLES 8–15

The resin of Example 4 was molded into unfilled one-eighth inch castings and 1 x 3 inch specimens were exposed to various environments for 100 days. The percentage weight gained for the various environments and the temperature maintained during the 100 days is reported in Table I.

TABLE I

| Environment | | Temperature, °C. | Weight gained, percent |
|---|---|---|---|
| Example: | | | |
| 8 | 75% $H_2SO_4$ | 80 | 17.9 |
| 9 | 15% HCl | 80 | 0.6 |
| 10 | 10% $HNO_3$ | 80 | 0.8 |
| 11 | 25% $CH_3COOH$ | 80 | 4.1 |
| 12 | 10% $NH_4OH$ | 80 | 2.4 |
| 13 | 10% $CuSO_4$ | 80 | 0.8 |
| 14 | 5% NaOCl | 50 | 0.4 |
| 15 | $H_2O$ | 50 | 0.5 |

As can be seen from the above table, the resin exhibited very good to excellent resistance to these invironments.

EXAMPLES 16–28

The resin of Example 4 was tested according to the S.P.I. Commercial Standard for Custom Fabricated Reinforced Polyester Corrosion Resistant Process Equipment. The samples were maintained at 25 degrees centigrade for 50 days and the results are reported in Table II.

TABLE II

| Environment | Weight change, percent | Volume change, percent | Barcol hardness retained, percent | Flexural strength retained, percent |
|---|---|---|---|---|
| Example: | | | | |
| 16 _____ 35% $H_2SO_4$ _____ | 0.2 | 0.0 | 100.0 | 99.6 |
| 17 _____ 10% HCl _____ | 0.1 | 0.0 | 97.1 | 100.0 |
| 18 _____ 5% $HNO_3$ _____ | 0.2 | 2.0 | 98.6 | 100.0 |
| 19 _____ 25% $CH_3COOH$ _____ | 0.3 | 3.2 | 94.6 | 100.0 |
| 20 _____ 10% $H_3PO_4$ _____ | 0.2 | 1.6 | 100.0 | 100.0 |
| 21 _____ 10% NaOH _____ | 0.8 | 1.8 | 100.0 | 100.0 |
| 22 _____ 10% $Na_2CO_3$ _____ | 0.1 | 1.5 | 97.0 | 100.0 |
| 23 _____ Saturated NaCl _____ | 0.1 | 0.5 | 100.0 | 100.0 |
| 24 _____ 5% $Al_2(SO_4)_3 \cdot K_2SO_4 \cdot 12H_2O$ ____ | 0.4 | 0.4 | 100.0 | 100.0 |
| 25 _____ 5% $H_2O_2$ _____ | 0.4 | 0.4 | 100.0 | 100.0 |
| 26 _____ $H_2O$ _____ | 0.3 | 0.1 | 100.0 | 100.0 |
| 27 _____ Kerosene _____ | 0.3 | 0.0 | 97.1 | 90.8 |
| 28 _____ 5.25% NaOCl _____ | 0.8 | 3.0 | 100.0 | 100.0 |

As can be seen from the above table, the resin exhibited very good to excellent resistance to these environments.

Various changes and modifications can be made in the process and products of this invention without departing from the spirit and scope of the invention. The various embodiments of the invention disclosed herein serve to further illustrate the invention but are not intended to limit it.

We claim:
1. A polymerizable mixture comprising (A) a polymerizable polyester of ingredients comprising (1) about 0.05 to about 0.35 mole fraction of an adduct of a polyhalogenated cyclopentadiene and a polycarboxylic compound containing aliphatic carbon-to-carbon unsaturation, (2) about 0.10 to about 0.40 mole fraction of a polycarboxylic compound containing aliphatic carbon-to-carbon unsaturation, (3) about 0.01 to about 0.20 mole fraction of dimer acid, and (4) about 0.45 to about 0.60 mole fraction of 2,2,4-trimethyl-3-,3-pentanediol, and (B) a polymerizable compound containing aliphatic carbon-to-carbon unsaturation.

2. The composition of claim 1 wherein said (1) adduct is the reaction product of hexachlorocyclopentadiene and a dicarboxylic compound containing ethylenic unsaturation, said (2) polycarboxylic compound is dicarboxylic and contains ethylenic unsaturation, and wherein said (B) polymerizable compound is monomeric and contains ethylenic unsaturation.

3. The composition of claim 2 wherein said (1) adduct is chlorendic acid, said (2) polycarboxylic compound is fumaric acid, and said (B) polymerizable compound is styrene.

4. The composition of claim 2 having a polymerization inhibitor added thereto.

5. The composition of claim 2 when polymerized to an infusible-insoluble resinous composition.

6. The composition of claim 2 when mixed with an inert filler and polymerized to an infusible, insoluble resinous composition.

7. A composition of matter comprising: a polymerizable polyester of ingredients comprising (1) about 0.05 to about 0.35 mole fraction of an adduct of a polyhalogenated cyclopentadiene and a polycarboxylic compound containing aliphatic carbon-to-carbon unsaturation, (2) about 0.10 to about 0.40 mole fraction of a polycarboxylic compound containing aliphatic carbon-to-carbon unsaturation, (3) about 0.01 to about 0.20 mole fraction of dimer acid, and (4) about 0.45 to about 0.60 mole fraction of 2,2,4-trimethyl 1,3-pentanediol.

8. The composition of claim 7 wherein said (1) adduct is a reaction product of hexachlorocyclopentadiene and a dicarboxylic compound containing ethylenic unsaturation, and said (2) polycarboxylic compound is dicarboxylic and contains ethylenic unsaturation.

9. The composition of claim 8 wherein the adduct is chlorendic acid.

10. The composition of claim 9 wherein the polycarboxylic compound is fumaric acid.

11. The composition of claim 8 wherein the adduct is chlorendic acid and the polycarboxylic compound is maleic anhydride.

References Cited

UNITED STATES PATENTS

| 2,873,210 | 2/1959 | Barrett et al. | 260—22 |
| 3,311,578 | 3/1967 | Laakso | 260—22 |
| 3,367,894 | 2/1968 | Bruggeman | 260—22 |
| 3,390,135 | 6/1968 | Seiner | 260—75 |

DONALD E. CZAJA, Primary Examiner

R. W. GRIFFIN, Assistant Examiner

U.S. Cl. X.R.

117—126, 136, 161; 161—403; 138—178; 260—2.5, 23, 40, 41

PO-1050
(5/69)

UNITED STATES PATENT OFFICE
CERTIFICATE OF CORRECTION

Patent No. 3,488,305      Dated January 6, 1970

Inventor(s) Carmine A. Siconolfi et al.

It is certified that error appears in the above-identified patent and that said Letters Patent are hereby corrected as shown below:

Column 2, line 32, for "trixotropic" read -- thixotropic --. Column 3, line 20, for "23" read -- 2,3 --; Column 3, line 24, for "hexacloro" read -- hexachloro --. Column 6, line 2, for "small" read -- smaller --.

SIGNED AND
SEALED
JUN 16 1970

(SEAL)
Attest:

Edward M. Fletcher, Jr.
Attesting Officer

WILLIAM E. SCHUYLER, JR.
Commissioner of Patents